(12) United States Patent
Han et al.

(10) Patent No.: US 7,182,648 B2
(45) Date of Patent: Feb. 27, 2007

(54) OPTICAL-ELECTRIC CONNECTOR WITH IMPROVED CONTACT HAVING COIL SPRING

(75) Inventors: Honggiang Han, Kunsan (CN); Guohua Zhang, Kunsan (CN); ZiQiang Zhu, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/982,100

(22) Filed: Nov. 4, 2004

(65) Prior Publication Data

US 2005/0100285 A1 May 12, 2005

(30) Foreign Application Priority Data

Nov. 6, 2003 (CN) .................. 2003 2 0120507

(51) Int. Cl.
*H01R 24/04* (2006.01)
(52) U.S. Cl. .................. 439/668; 439/577; 385/75
(58) Field of Classification Search .............. 439/668, 439/669, 577, 840, 839; 385/75, 88, 89
See application file for complete search history.

(56) References Cited

U.S. PATENT DOCUMENTS

| 3,243,755 | A | * | 3/1966 | Johnston ..................... 439/825 |
| 3,949,180 | A | * | 4/1976 | Ojima et al. ................ 200/51.1 |
| 4,426,558 | A | * | 1/1984 | Tanaka et al. ........... 200/51.09 |
| 4,491,382 | A | * | 1/1985 | Ishikawa ..................... 439/839 |
| 4,493,526 | A | * | 1/1985 | Masuda ....................... 439/668 |
| 4,699,444 | A | * | 10/1987 | Isohata ....................... 439/839 |
| 4,778,240 | A | * | 10/1988 | Komatsu ....................... 385/88 |
| 4,869,566 | A | | 9/1989 | Juso et al. |
| 4,978,310 | A | * | 12/1990 | Shichida ..................... 439/188 |
| 5,092,795 | A | * | 3/1992 | Kitagawa ..................... 439/668 |
| 5,338,215 | A | * | 8/1994 | Lee et al. .................... 439/188 |
| 6,000,970 | A | * | 12/1999 | Wu .............................. 439/669 |
| 6,109,797 | A | | 8/2000 | Nagura et al. |
| 6,238,249 | B1 | | 5/2001 | Kuwamura |
| 6,293,833 | B1 | * | 9/2001 | Kamath ....................... 439/851 |
| 6,475,001 | B2 | | 11/2002 | Ohbayashi et al. |
| 6,524,138 | B1 | * | 2/2003 | Li et al. ...................... 439/669 |
| 6,588,947 | B2 | | 7/2003 | Mine et al. |

* cited by examiner

*Primary Examiner*—Hae Moon Hyeon
(74) *Attorney, Agent, or Firm*—Wei Te Chung

(57) ABSTRACT

An optical-electric connector (1) has an insulative housing (10), a plurality of contacts (21, 22, 23, 24, 25) received in the housing, and an optical-electric converter (30) assembled in the housing. The housing defines a receiving space (14) for receiving a mating plug and a plurality of passageways (16) for receiving the contacts. One of the resilient contacts forms an elastic contacting arm (212) extending into the receiving space and a retention section (211). A coil spring (214) is assembled between the retention section and the elastic contacting arm. The retention section of the contact securely holds the coil spring in its place.

14 Claims, 7 Drawing Sheets

OPTICAL-ELECTRIC CONNECTOR WITH IMPROVED CONTACT HAVING COIL SPRING

BACKGROUND OF THE INVENTION

1. Field of the Invention

The present invention generally relates to a connector, and particularly relates to an optical-electric connector which can selectively mate with an electric plug or an optical fiber plug.

2. Description of Prior Arts

U.S. Pat. No. 6,238,249 discloses an optical-electric connector comprising: an optical-electric converter, which receives and transmits an optical signal from/to the optical plug when the optical plug is connected to the optical-electric connector; a first terminal extending from the converter and adapted to be fixed onto a surface of a printed board for receiving and transmitting an electric signal; a second terminal adapted to be fixed onto the surface of the printed board for receiving and transmitting an electric signal from/to the electric plug when the electric plug is connected to the optical-electric connector; a retainer holding the converter and the first and second terminals; and a plurality of ribs projecting from a peripheral portion of the retainer.

The second terminal of the optical-electric connector disclosed in the above-mentioned patent commonly has an elastic contacting arm for contact with the electric plug. Since the elastic contacting arm is subjected to an elastic deformation each time when the plug is inserted or withdrawn, a repeated insertion or withdrawal of the plug will result in a fatigue of the terminal, and causes a poor contact between the terminal and the plug.

Hence, it is desirable to have an optical-electric connector with an improved resilient contact to overcome the above-mentioned disadvantages of the prior art.

SUMMARY OF THE INVENTION

It is an object of the present invention to provide an optical-electric connector with an improved resilient contact which can assure a reliable, electrical connecting with an inserted, complementary plug.

In order to achieve the above-mentioned object, an optical-electric connector in accordance with the present invention has an insulative housing, a plurality of contacts received in the housing, and an optical-electric converter assembled in the housing. The housing defines a receiving space for receiving a mating plug and a plurality of passageways for receiving the contacts. One of the resilient contacts forms an elastic contacting arm extending into the receiving space and a retention section. A coil spring is assembled between the retention section and the elastic contacting arm. The retention section of the contact securely holds the coil spring in its place.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
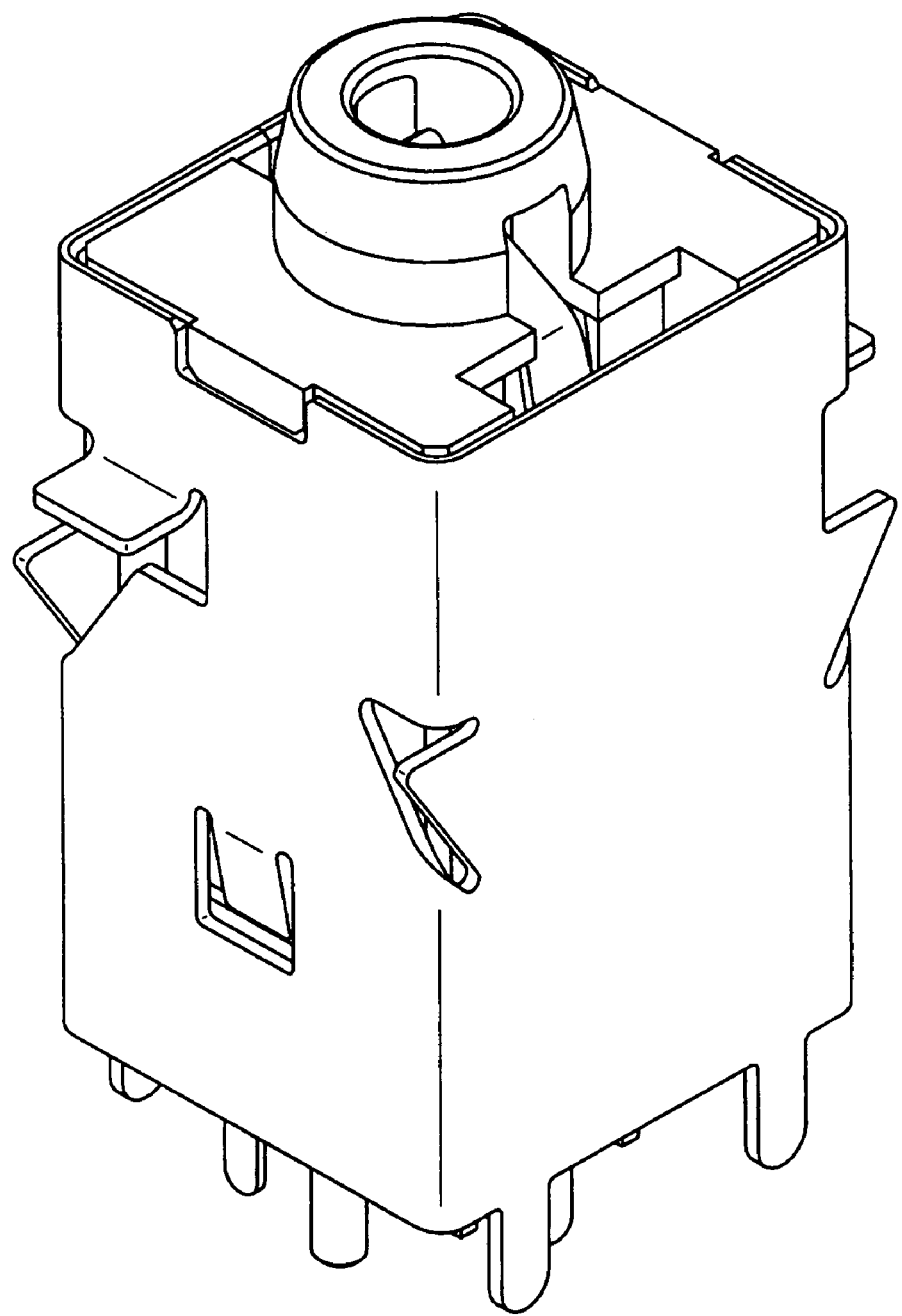
FIG. 1 is a perspective view of an optical-electric connector in accordance with the present invention.

Reference will now be made to the drawing figures to describe the present invention in detail.

With reference to FIGS. 1 to 4, an optical-electric connector in accordance with the present invention is a straight-shaped jack connector 1 and comprises an insulating housing 10, a plurality of contacts 20, an optical-electric converter 30 and a metal shielding 40 enclosing the housing 10.

The insulative housing 10 is straight-shaped and comprises a mating portion 11, a mounting portion 12, and three side portions 13 connecting the mating and mounting portion 11, 12, a receiving space 14, and a spacer 15 installed in a rear side of the insulative housing 10. The housing 10 defines a plurality of passageways 16 for receiving the contacts 20. Four guiding posts 18 are provided on rear edges of two side portions 13. One of the guiding posts 18 extends from an end of a fastening post (not labeled) disposed between one of the passageways 16 and the receiving space 14. A front side portion 13 defines a plurality of recesses 19.

The mating portion 11 of the insulative housing 10 forms a cylinder-shaped mating end 110 defining a plug receiving opening 11 extending through the mating portion 11 and communicating with the receiving space 14. The plug receiving opening 111 mates with an electric or optical fiber plug (not shown) for transmitting signals. The receiving space 14 of the insulative housing 10 divides into two parts by a partition 17. A first part 140 is above the partition 17, and a second part 141 is below the partition 17.

The partition 17 comprises an upper and a lower surfaces 170, 171 and a plug receiving hole 172 extending through the upper and lower surfaces 170, 171. The plug receiving hole 172 has a funnel-shaped portion 173 at a top end thereof for receiving the electric or optical fiber plug. The plug receiving hole 172, the funnel-shaped portion 173, and the plug receiving opening 111 of the mating end 110 have a same axis.

Figure 5:
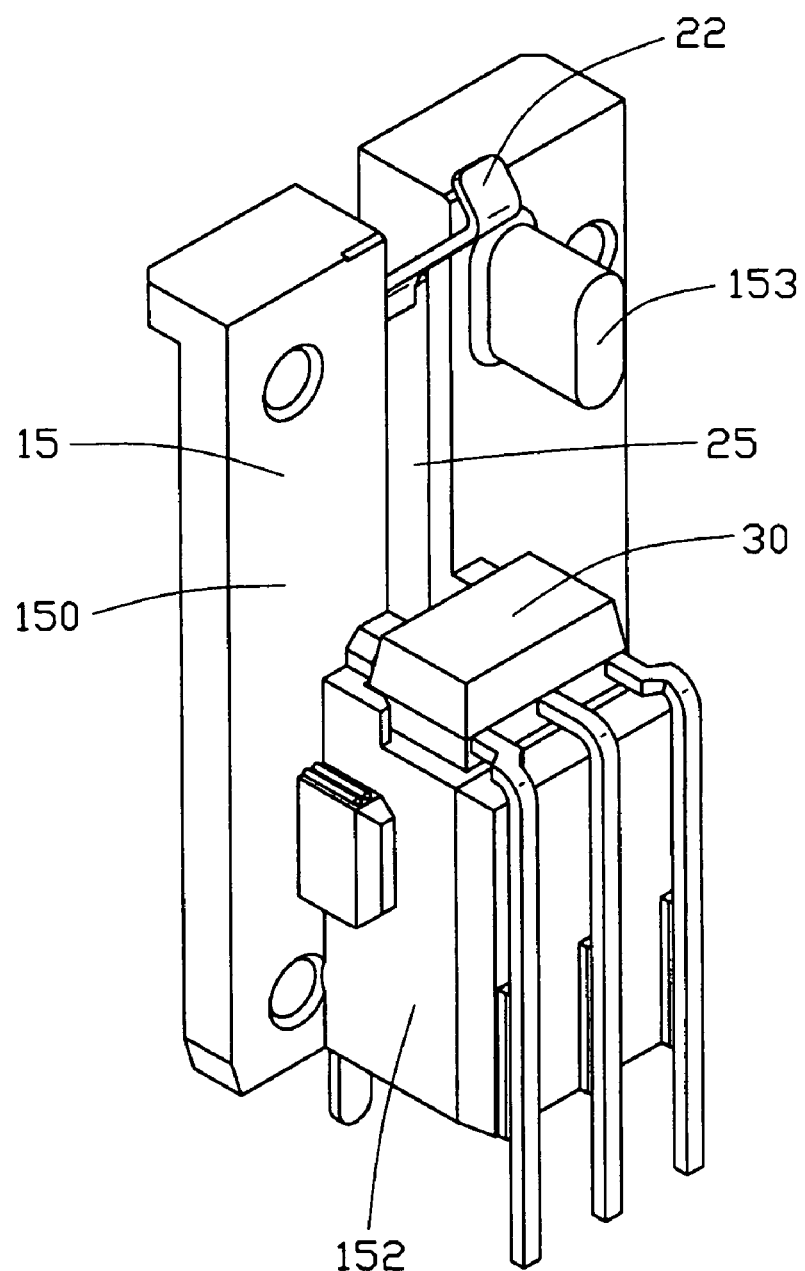
FIG. 5 is an assembled, perspective view of a spacer, an optical-electric converter, and the contacts of FIG. 2.

The contacts 20 are installed in the passageways 16 of the insulative housing 10. The contacts 20 include four resilient contacts 21, 22, 23, 24 and a fixed contact 25. The four resilient contacts 21, 22, 23, 24 are assembled into the side portions 13 and the spacer 15 respectively. The fixed contact 25 is assembled to the spacer 15 and contacts the resilient contact 24 (FIG. 5). Upper ends (not labeled) of the four resilient contacts 21, 22, 23, 24 extend into the first part 140 and tail ends (not labeled) are soldered to a printed circuit board (not shown).

Figure 6:
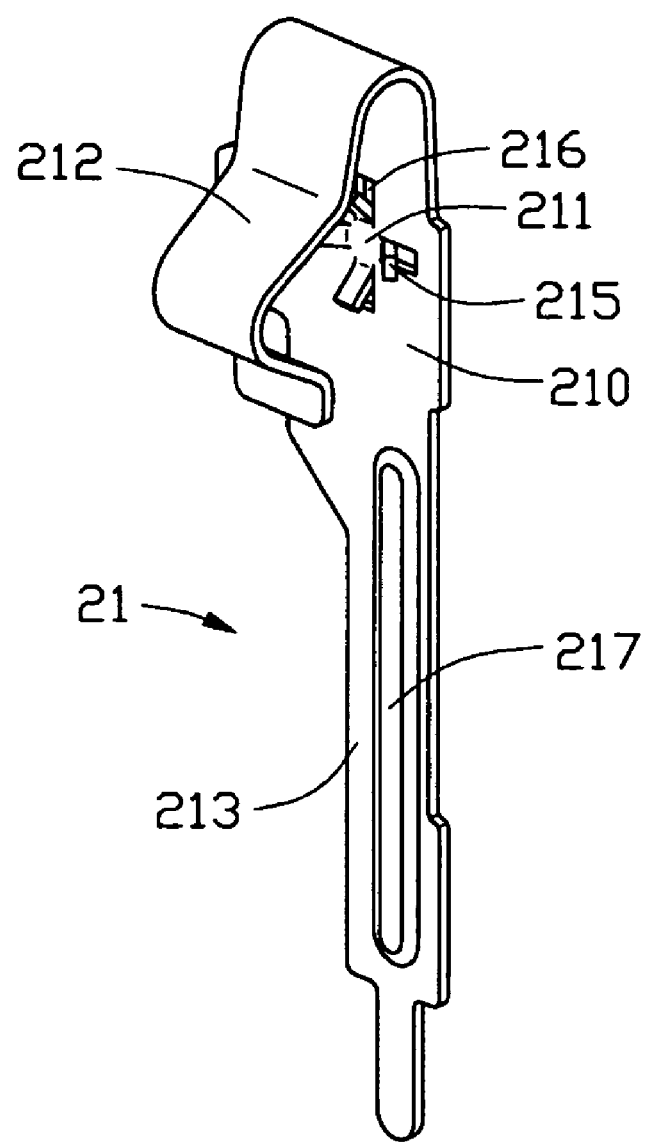
FIG. 6 is a perspective view of a resilient contact of the optical-electric connector.
Figure 7:
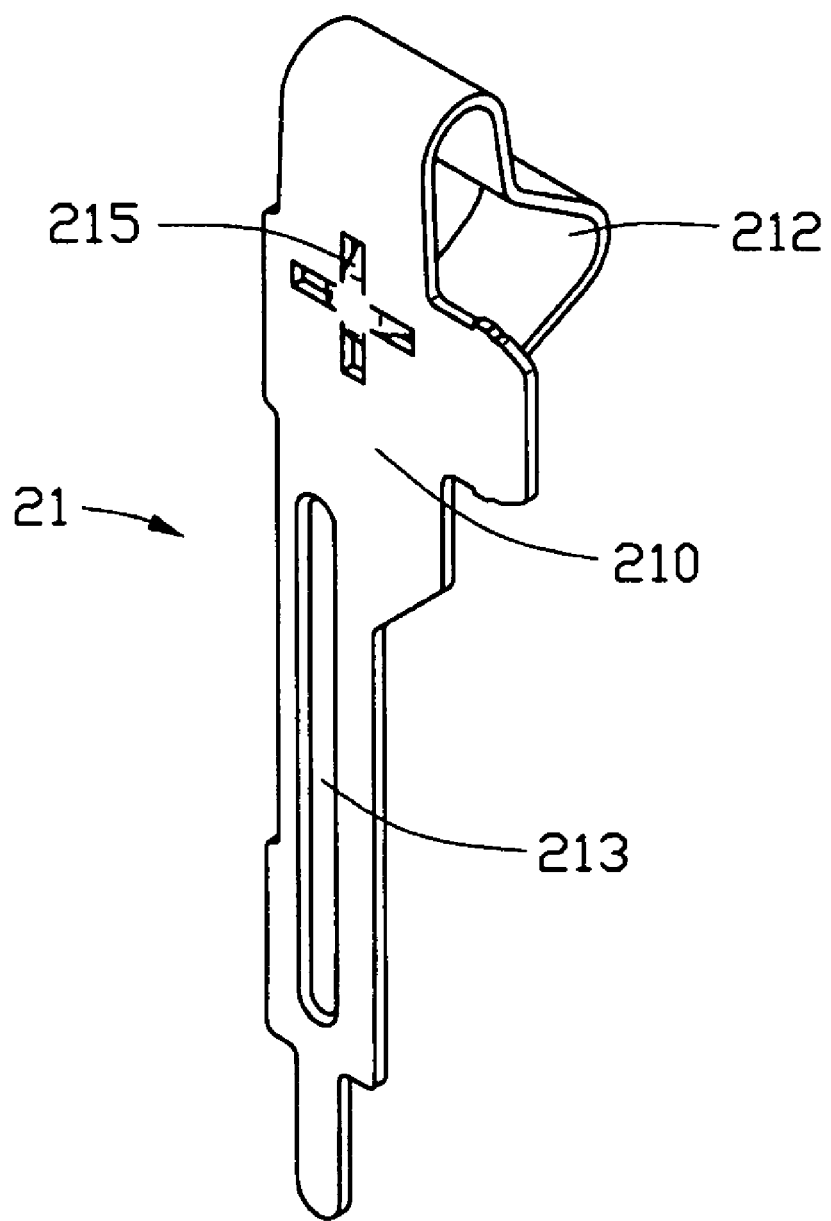
FIG. 7 is a view similar to FIG. 6 but taken from a different perspective.

Further referring to FIGS. 6 and 7, the resilient contacts 21 comprises a base section 210 downwardly extending in a vertical direction, a curved elastic contacting arm 212 extending downwardly from an upper edge of the base section 210 and a retaining section 213 extending from a lower edge of the base section 210. A retention section 211 is formed on an upper portion of the base section 210. and the contact arm 212 forms a downward U-shaped elastic bight connecting to the upper edge of the base section 210 and a concave in alignment with the retention section 211 in a lateral direction perpendicular to the vertical direction. While the resilient contact 21 is received in corresponding passageway 16, the elastic contacting arm 212 extends into the first part 140. A rib 217 extending vertically is defined on the retaining section 213 for being retained in the passageway 16. The retention section 211 comprises four symmetrically positioned retention tabs 215. Each retention tab 215 extends slantways towards the elastic contacting arm 212 and a positioning groove 216 is formed between the base section 210 and the corresponding retention tab 215.

Figure 2:
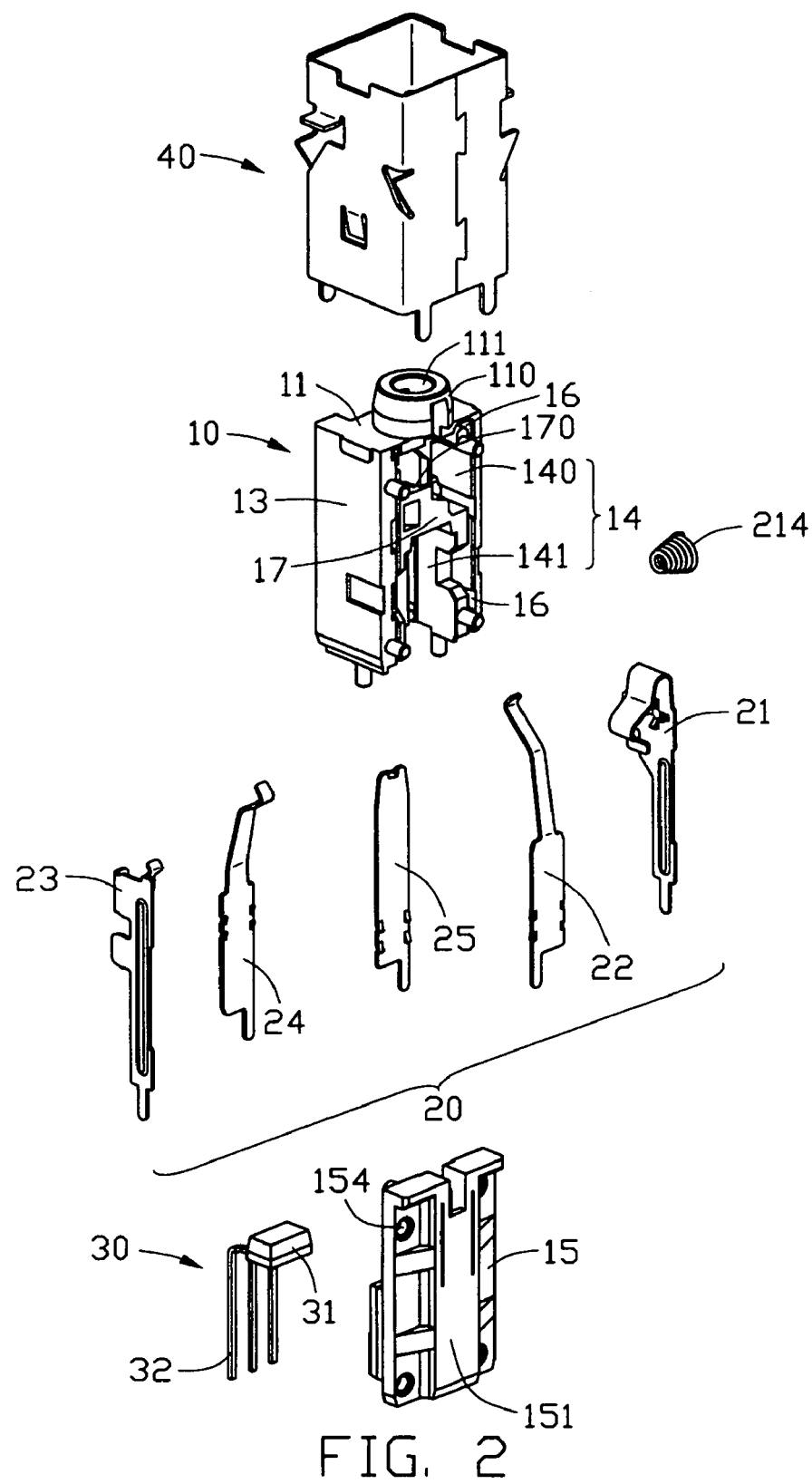
FIG. 2 is an exploded, perspective view of the optical-electric connector of FIG. 1.
Figure 3:
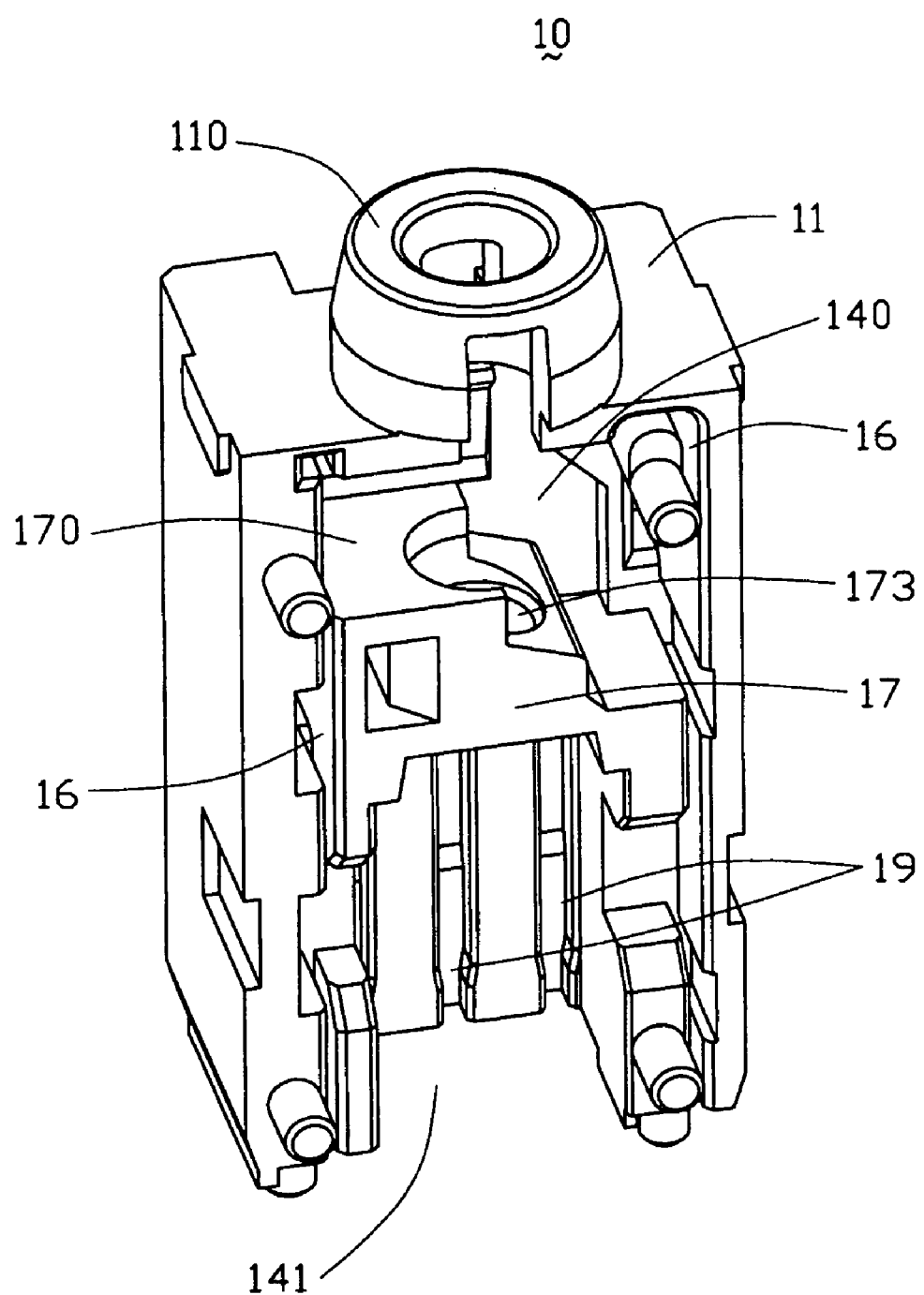
FIG. 3 is a perspective view of an insulative housing of the optical-electric connector.
Figure 4:
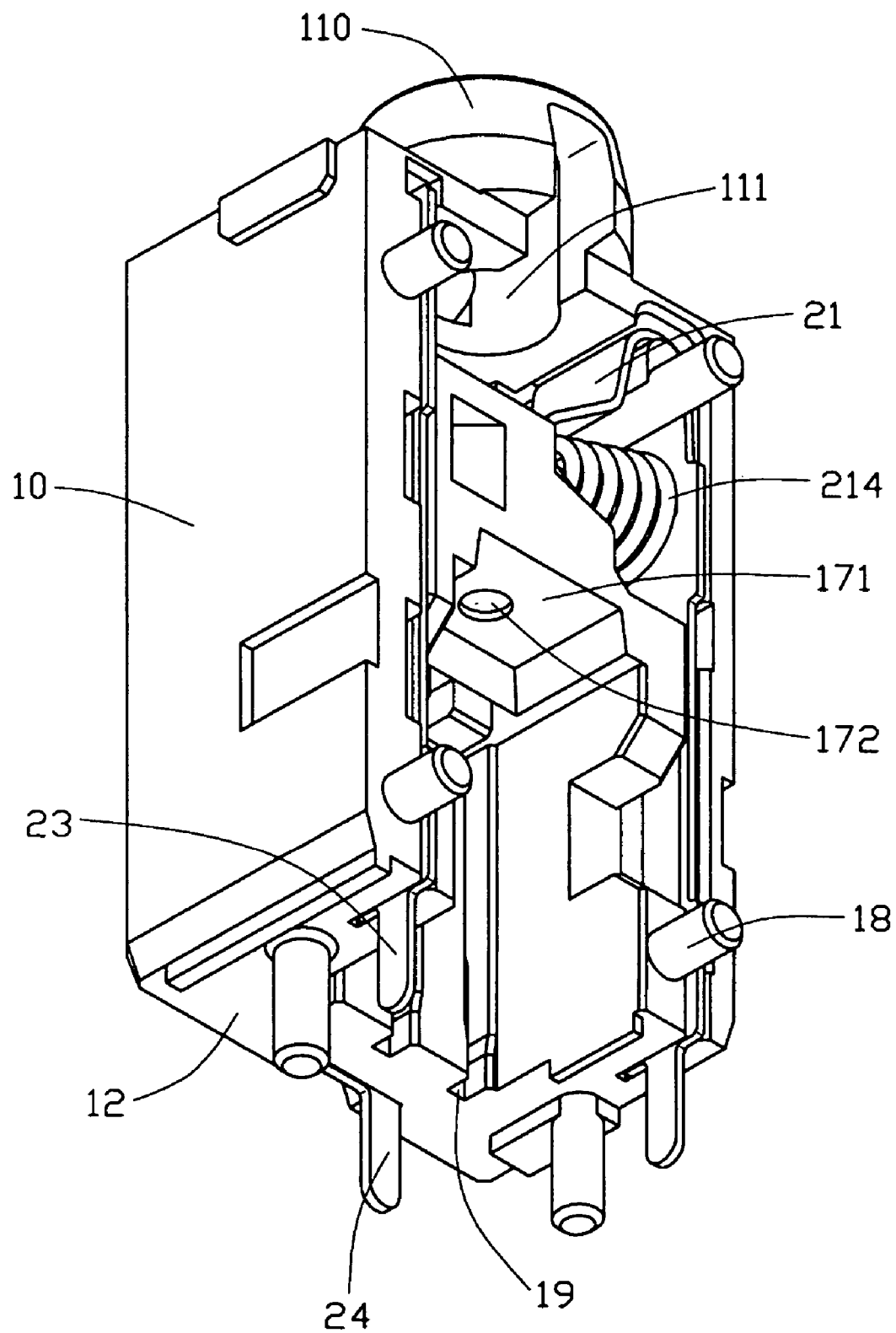
FIG. 4 is an assembled, perspective view of the insulative housing and contacts.

With reference to FIGS. 2 and 4, the optical-electric connector 1 further comprises a cone-shaped spring 214 received in the housing 10 and engaging with the retention section 211. The spring 214 is sandwiched between the elastic contacting arm 212 and the retention section 211, and has a larger end engaged in the positioning groove 216 and a smaller end abutting against the elastic contacting arm 212.

Turning to FIG. 5, the spacer 15 comprises an inner wall 150 facing the receiving space 14 and a T-shaped outer wall 151 (FIG. 2). A supporting body 152 formed at the inner wall 150 accommodates the optical-electric converter 30 thereon. The optical-electric converter 30 is designed to receive and transmit an optical signal from/to the optical fiber plug when the optical fiber plug is matching with the optical-electric connector. The optical-electric converter 30 comprises an optical element 31 positioned on the supporting body 152, and a plurality of tail portions 32 extending downwardly along an outer face of the supporting body 152. A projection 153 extends from the inner wall 150 into the first part 140 for securing the spacer 15. Four apertures 154 are defined at opposite corners and extend through the inner and the outer walls 150, 151 of the spacer 15. The apertures 154 respectively mate with corresponding guiding posts 18 of the insulative housing 10. The spacer 15 connects the insulative housing 10 securely by heating the apertures 154 and the guiding posts 18, as well known in the art. When the spacer 15 is assembled to the insulative housing 10, the supporting body 152 extends into the second part 141 of the receiving space 14. The optical element 31 of the optical-electric converter 30 is below the plug receiving hole 172 and adjacent to the partition 17, and the tail portions 32 are retained in corresponding recesses 19 of the insulative housing 10. The tail portions 32 extend outside of the housing 10 and are soldered to the PCB.

In use, the electric plug is inserted into the plug receiving opening 111 of the mating end 110, and electrically contacts the resilient contacts 21, 22, 23, 24. Due to the funnel-shaped portion 173 of the partition 17 which has a larger diameter at an upper end, and a smaller diameter at a lower end, the electric plug can be exactly inserted into the upper end of the funnel-shaped portion 173 and received in the first part 140. When an optical fiber plug is inserted into the housing 10, the optical fiber plug rests in the funnel shaped portions 173 and matches the optical element 31 of the optical-electric converter 30 for transmitting signals.

The spring 214 supplement the resiliency of the curved contact arm 22. When an electric plug or an optical fiber plug is inserted into the plug receiving opening 111 of the mating end 110, the elastic curved contact arm 212 is pressed down and the spring 214 is compressed, at the same time, the spring 214 gives a backward force to the elastic curved contact arm 212, so that an increased normal force is provided between the elastic curved contact arm 212 and the inserted plug, which assures a reliable, electrical connection there between.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An optical-electric connector comprising:
   an insulative housing defining a receiving space and a plurality of passageways;
   a plurality of contacts received in the passageways of the insulative housing, at least one of the contacts comprising a base section and an elastic contacting arm extending from the base section into the receiving space, a retention section integrally formed on the base section;
   an optical-electric converter installed in the insulative housing and having an optical element for optically connecting an optical fiber plug, and a plurality of tail portions; and
   a spring engaging with the retention section of said at least one contact;
   wherein the spring is sandwiched between the elastic contacting arm and the retention section for assuring a reliable, electrical connection between the contacting arm and an inserted plug; and
   wherein the retention section defines a plurality of symmetrically positioned retention tabs, each extending slantways from the base section towards the elastic contacting arm, one end of the spring engaging partly into a groove defined between the retention tabs and the base section.

2. The optical-electric connector as described in 1, wherein the spring is cone-shaped and has a large end engaged by the retention tabs, and a small end fitting into a concave defined by the elastic contacting arm and abutting against the concave.

3. The optical-electric connector as disclosed in claim 2, wherein the insulative housing comprises a mating portion defining a plug receiving opening extending therethrough and communicating with the receiving space.

4. The optical-electric connector as described in claim 3, wherein a partition is positioned in the receiving space and divides the receiving space into first and second parts.

5. The optical-electric connector as described in claim 4, wherein the partition defines a plug receiving hole for mating with the optical fiber plug, the plug receiving hole and the plug receiving opening of the mating portion having a same axis.

6. The optical-electric connector as described in claim 5, further comprising a spacer assembled to the insulative housing and having a supporting body connecting with the optical-electric converter.

7. The optical-electric connector as described in claim 6, wherein the supporting body is received in the second pan of the receiving space.

8. The optical-electric connector as described in claim 6, wherein the contacts comprise a fixed contact assembled to the spacer.

9. The optical-electric connector as described in claim 1, further comprising a metal shielding enclosing the insulative housing.

10. An electrical contact for use in a connector, comprising:
    an elongated base section;
    a retention section integrally formed on an upper portion of the base section;

an elastic contacting arm continuously extending downwardly from an upper edge of the base section adjacent to the retention section; and a spring assembled between the retention section and the elastic contacting arm; and wherein the retention section consists of four retention tabs located symmetrically, each extending slantways from the base section towards the elastic contacting arm, one end of the spring engaging partly into a groove defined between the retention tabs and the base section.

11. The electrical contact as described in claim 10, wherein the spring is cone-shaped, and has a large end engaged by the retention tabs, and a small end fitting into a concave defined by the elastic contacting arm and abutting against the concave.

12. The electrical contact as described in claim 11, further comprising a retaining section extending from the base section, and a rib projecting from the retaining section and extending in a vertical direction.

13. An electrical connector comprising: an insulative housing defining an upward receiving space along a vertical direction;

at least one contact made in a form of one piece and disposed in the housing and including a base section abutting against an wall of the housing, a retention section being defined on the base section and an elastic curved contact arm extending from an upper end of the base section and backwardly with a portion thereof into the plug receiving space and with a downward U-shaped bight at a joint portion of said contact arm and said base section;

a spring sandwiched between the retention section and the contact arm; wherein said retention section defines a holding device to retain one end of the spring, and said the contact arm forms an concave in alignment with the spring in a lateral direction perpendicular to said vertical direction to receive the other end of the spring therein; and the housing further forming a fastening post extending in another lateral direction, perpendicular to both said vertical direction and said lateral direction, and essentially located within the downward U-shaped bight.

14. The electrical connector as described in 13, wherein said fastening post is located between the downward U-shaped bight and the spring in said vertical direction.

* * * * *